(No Model.)
W. J. FITZPATRICK.
GEARING FOR BICYCLES.
No. 401,425. Patented Apr. 16, 1889.
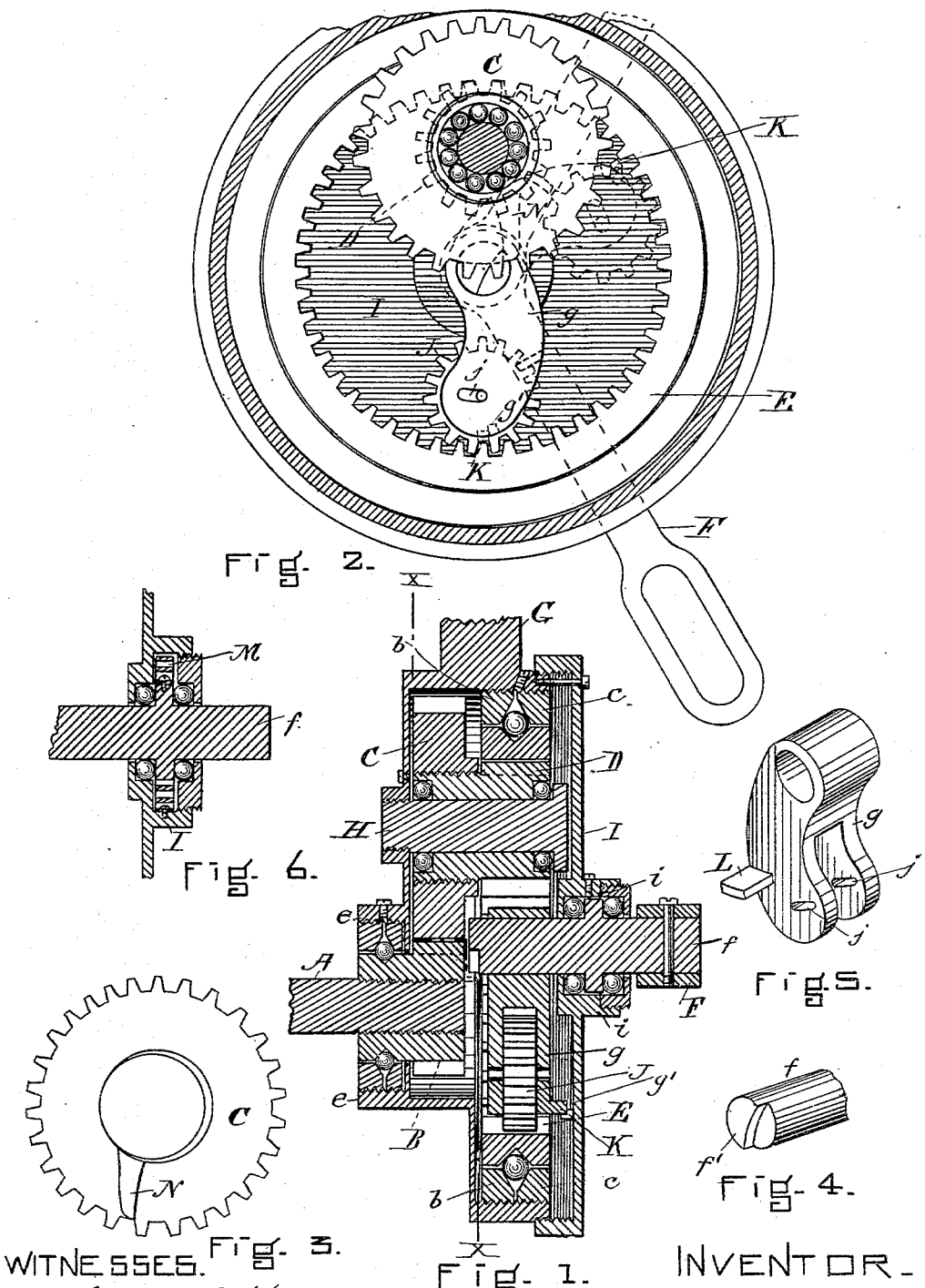
WITNESSES.
John H. Taylor.
Ellen B. Tomlinson.
INVENTOR.
William J. Fitzpatrick
by Alex P. Browne,
attorney.

UNITED STATES PATENT OFFICE.

WILLIAM J. FITZPATRICK, OF SOUTH BOSTON, MASSACHUSETTS.

GEARING FOR BICYCLES.

SPECIFICATION forming part of Letters Patent No. 401,425, dated April 16, 1889.

Application filed January 31, 1889. Serial No. 298,207. (No model.)

*To all whom it may concern:*

Be it known that I, WILLIAM J. FITZPATRICK, of South Boston, in the county of Suffolk and State of Massachusetts, a citizen of the United States, have invented certain new and useful Improvements in Propulsion Gearing, of which the following is a specification.

My invention relates particularly to pedal-gearing mechanism intended for use in that class of vehicles—such as bicycles—wherein the wheel is caused to revolve by power applied from the foot of the rider. Its object is to produce a mechanism which shall contain a pedal-operated driving-gear and a driven gear fastened to and turning the bicycle-wheel axle, whereby there shall be obtained the benefit of increased speed or power and also safety against the "header motion" of the vehicle, so called, around the axle of the driven wheel by reason of improvements in the construction and arrangement of the said gearing.

In the accompanying drawings I have represented those portions of a bicycle-wheel axle, fork, and driving-gear necessary to illustrate my present improvement.

Figure 1 is a view in vertical section; Fig. 2, a side view in section on the line $xx$ of Fig. 1; and Figs. 3 to 6, inclusive, views of details of the apparatus, as will be hereinafter more fully explained.

In the drawings, A represents a portion of the axle of the bicycle-wheel to be driven.

B represents a circular gear secured upon the axle near its extremity and in a suitable manner, whereby rotation is imparted to the axle.

C D represent an intermediate gear, a portion, C, of which meshes with the axle-gear B, and the other portion, D, of which meshes internally with the driving-gear E, which is itself turned by power derived from the pedal-arm F.

All of the mechanism heretofore described is located in a shell or recess formed at the lower part of the fork G of the vehicle.

The preferred ratio of the gears above mentioned and that shown in the drawings is as follows: The gears B and D are of the same size, and the driving-gear C is to each of them as two to one. The gear E is to the gear D as three to one. It follows from this that a third of a revolution of E produces one revolution of D and also of C, they being connected together, and one revolution of C produces two revolutions of the axle-gear, and consequently of the bicycle-wheel.

Each of the gears before described may be provided with ball-bearings, and they are so represented. The gear B has a single row of balls turning in a grooved bearing in the shell at $e$. The gears C D have a double row of balls turning upon a stud, H, which is attached to the shell in any convenient manner.

The gear E has a single external row of balls turning in grooves formed in circular nuts $b\ c$, also located in the shell of the fork, as shown. Furthermore, the shaft $f$ of the pedal F has a double row of ball-bearings located within a box, $i$, formed within the circular plate I, which covers and incloses the shell. Any suitable mechanism may be employed in connection with the gear E, and the ordinary pedal-arm of a bicycle, whereby power applied to the pedal-arm shall cause the gear E, with its connected pedal-gearing, to revolve. I prefer, however, to employ for this purpose the locking and releasing connection, which I will now proceed to describe.

Upon the inner end of the shaft $f$ of the pedal-arm F is secured an arm, $g$, to which at its lower portion is attached (see Fig. 1) a pawl-gear, J. For a convenient means of attaching this gear to the arm I form its lower portion in a fork, as shown. The shaft of the gear J works in slots $j$ in the fork of the arm $g$. Two stops, K K, placed upon the plate I at a distance apart equal to one-third of the circumference of the gear E, come within the path of a projection, $g'$, upon the arm $g$ (shown in Fig. 1) and limit its motion, and consequently the motion of the pedal, to the arc of which the stops represent the extremities. Upon the arm $g$ is also a locking-pin, L, (see Fig. 5,) of a width sufficient to fit between two of the teeth on the pawl-gear J, and thus lock it to the arm $g$, and thereby convert the gear while locked into a pawl.

The mechanism thus far described operates as follows: The pedal-arm F being supposed to be at its highest point, if downward pressure be applied to it, this locks the arm $g$ into the gear J, thus converting it into a pawl, and the continued descent of the pedal-arm F, acting through this pawl, drives the gear E around until the arm $g$ strikes the lower stop K. This amount of revolution of the gear E, by reason of the ratio of the gears, as before explained, produces two revolutions of the axle of the bicycle.

The return of the pedal to its highest point may be accomplished by a coiled spring, M, (see Fig. 6,) in the ordinary manner, having its fixed end fast to the plate I and its free end to the shaft $f$. I prefer, however, to employ mechanism whereby the pedal shall be positively returned by the revolution of the intermediate gear, C, which mechanism I will now proceed to describe.

I provide upon the inner extremity of the shaft $f$ a projection, $f'$, (see Fig. 4,) having a portion cut away in an arc of a circle, as shown, and upon the side of the gear C, I provide a single tooth or wiper, N. (See Fig. 3.) The projection $f'$ is so located upon the extremity of the shaft $f$ that when the pedal is in its lowest position a portion of the projection $f'$ shall lie within the path of the wiper N. When, therefore, the gear C revolves, this wiper, being brought in contact with the corner of the projection $f'$, turns the shaft $f$ back until the pedal F is restored to its highest position. The operation of this portion of the machine can be best seen at Fig. 2.

It should be observed that the slotted connection between the fork of the arm $g$ and the pawl-gear J is for the purpose of allowing sufficient play between the arm $g$ and the pawl-gear J that when the pedal-arm is descending the pin may enter and lock the gear; but in the reverse motion—when the pedal-arm is ascending—the gear may move slightly backward, so as to turn freely and clear of the locking-pin L.

By reason of the mechanism hereinbefore described it will also be seen that header motion—that is to say, motion of the fork and connected gearing around the axle of the vehicle as a center—will be guarded against.

The operation of the machine in this respect is as follows: Assuming the main wheel of the bicycle upon the shaft A to meet with an obstacle which checks its forward motion, the tendency of the fork and its connected parts is to move around the axle A as a center. This will produce a reverse motion in the gears C D, and consequently in the gear E. Should this occur when the pedal-arm F is at its highest point, the motion of the fork around the axle will be at once checked, because the upper stop K will engage with the projection $g'$. This prevents further upward motion of the arm $g$, and therefore further reverse or upward motion of the pawl-gear J, because it locks with the locking-pin L, and, since the pawl-gear J, being locked, cannot turn, the gear E and its connected gears are prevented from turning, and thus the header motion is checked.

As there is, of course, in a bicycle a duplication of these parts—viz., one set for each pedal—one or the other of the pedal-arms can never be farther from the upper stop K than one-half of the total arc of reciprocation, or one-sixth of the circumference of the gear E. Should the bicycle strike the obstacle when the arms are in this position, the reverse motion of the gear C will continue until the projection $g'$ brings up against the stop K on one side or the other, when a stopping of the reverse motion of the gearing will take place, as before. At the same time it will be obvious that the downward pressure of the rider upon that pedal which happens to be descending at the time will also tend to hold the gear E, and consequently the rest of the gearing, against reverse motion, and this pressure may be sufficient of itself to check the reverse or header motion. When this motion is checked, the main wheel of the bicycle, if the obstacle is not of too great height, will climb or jump over it like a wheel-barrow, but no header motion can take place.

I have hereinbefore described a certain preferred ratio of the gearing, and in connection with that ratio a certain specific position of the stops K—viz., at the ends of an arc equal to one-third of the circumference of the driving-gear. I have selected this specific ratio because I believe it to be in practice the most desirable. I think it obvious, however, that other ratios of gearing may be adopted, and if the ratio be changed it may be necessary, where a reciprocating motion is given to the pedal, to increase or decrease its range of motion beyond that hereinbefore set forth.

I claim—

1. In combination, the internal driving-gear, D, the pedal-arm and its shaft, an arm, $g$, also attached to and operated by said shaft, a pawl-gear, J, having its bearings in slots in the said arm $g$ and meshing with the driving-gear, and a locking-pin, L, attached to the said arm and adapted to enter the tooth of the pawl-gear to lock the same.

2. In combination, the internal driving-gear, D, the pedal-arm and its shaft, an arm, $g$, also attached to and operated by said shaft, a pawl-gear, J, having its bearings in slots in the said arm $g$ and meshing with the driving-gear, a locking-pin, L, attached to the said arm and adapted to enter the tooth of the pawl-gear to lock the same, and stops K K, located upon an adjacent portion of the fork or non-revolving part of the device and adapted to engage with a portion of the arm $g$ to stop its motion and that of its connected parts, as described.

3. In combination, the pedal-arm-returning mechanism herein described, consisting of the pedal-arm F, with its shaft $f$, having an arc-shaped projection, $f'$, formed thereon, and the gear C, having the projection N, adapted to strike against the said projection $f'$ to return the pedal-arm to its upper position.

4. In combination with the fork G, the cover-plate I, adapted to be attached thereto, the said plate being provided with stops K K, for the purpose set forth, and also with a box, $i$, to form a bearing for the pedal-arm shaft.

In testimony whereof I have hereunto subscribed my name this 19th day of January, A. D. 1889.

WILLIAM J. FITZPATRICK.

Witnesses:
JOHN H. TAYLOR,
ELLEN B. TOMLINSON.